(12) United States Patent
Fukano et al.

(10) Patent No.: US 7,142,163 B2
(45) Date of Patent: Nov. 28, 2006

(54) LOOP ANTENNA DEVICE

(75) Inventors: Takakazu Fukano, Nagano (JP); Yasuhiko Kosugi, Nagano (JP); Noboru Asauchi, Nagano (JP); Eiichi Ishii, Tokyo (JP)

(73) Assignees: Seiko Epson Corporation, Tokyo (JP); Yoshikawa RF Systems Co., Ltd., Tokyo (JP)

( * ) Notice: Subject to any disclaimer, the term of this patent is extended or adjusted under 35 U.S.C. 154(b) by 0 days.

(21) Appl. No.: 10/928,707

(22) Filed: Aug. 30, 2004

(65) Prior Publication Data

US 2005/0134519 A1     Jun. 23, 2005

(30) Foreign Application Priority Data

Aug. 29, 2003   (JP) .............................. 2003-209684

(51) Int. Cl.
*H01Q 11/12* (2006.01)
*H01Q 7/04* (2006.01)

(52) U.S. Cl. ..................... 343/742; 343/867; 343/842

(58) Field of Classification Search ................ 343/742, 343/741, 841, 842, 866, 867; 340/572, 505, 340/825, 826

See application file for complete search history.

(56) References Cited

U.S. PATENT DOCUMENTS

| 4,373,163 | A |   | 2/1983  | Vandebult |
| 4,539,558 | A |   | 9/1985  | Fearon |
| 4,751,516 | A | * | 6/1988  | Lichtblau ............... 343/742 |
| 4,866,455 | A | * | 9/1989  | Lichtblau ............... 343/742 |
| 4,972,198 | A | * | 11/1990 | Feltz et al. ............ 343/742 |
| 4,999,641 | A | * | 3/1991  | Cordery et al. ......... 343/742 |
| 5,602,556 | A |   | 2/1997  | Bowers |
| 5,663,738 | A |   | 9/1997  | Mueller |
| 5,963,173 | A |   | 10/1999 | Lian et al. |

FOREIGN PATENT DOCUMENTS

| GB | 2164824 A    | 3/1986 |
| JP | 10-209737 A  | 8/1998 |

* cited by examiner

*Primary Examiner*—Hoanganh Le
(74) *Attorney, Agent, or Firm*—Sughrue Mion, PLLC (57) ABSTRACT

A plurality of small loop antenna cells 61, 62 and 63 are magnetically coupled to an antenna coil 8 of a non-contact type data carrier 3. In the plurality of small loop antenna cells, the directions of the magnetic moments of the signals transmitted to the non-contact type data carrier 3 are opposite to each other, the sum of the magnetic moments generated from all the small loop antenna cells 61 to 63 is zero and a conductor forming a short ring pattern 67 is provided collectively for the plurality of small loop antenna cells. Thus, imbalance caused between the small loop antenna cells 61 to 63 can be compensated for by the short ring pattern 67.

9 Claims, 6 Drawing Sheets

LOOP ANTENNA DEVICE

BACKGROUND OF THE INVENTION

The present invention relates to a loop antenna device and more particularly to a loop antenna device preferably used for a reader/writer device of an electromagnetic induction type non-contact data carrier system in which data transmission and reception are executed in a non-contact state between a plurality of data carriers and the loop antenna device.

In general, a data carrier system includes a reader/writer device and a data carrier. An antenna device of the reader/writer device supplies a modulated alternating magnetic field to a service area to transmit data or a command to the data carrier.

The data carrier receives the modulated alternating magnetic field supplied to the service area using an incorporated coil to generate electromotive voltage that is rectified and used as an operating power source of the data carrier. The data carrier also executes prescribed operations, such as demodulation of the modulated alternating magnetic field for retrieving the data or the command sent from the reader/writer device and transmission of data to the reader/writer in accordance with the command.

Such a data carrier system is required to restrict the intensity of the alternating magnetic field supplied to the prescribed service area from the reader/writer within a prescribed range and to make a magnetic filed generated outside the service area as weak as possible.

The reason why an alternating magnetic field sufficiently strong but falling within the prescribed range needs to be supplied to the service area would be clear. The reason why the alternating magnetic field that reaches outside the service area is desirably as weak as possible is to eliminate interference with or adverse effect to another device. For example, when a plurality of the above-described reader/writer devices are arranged and installed adjacent to one another in, for instance, an automatic ticket-examination system of a station, it is necessary to eliminate interference with or an adverse effect to each other in operation. As this kind of the antenna device as a related art, for instance, a device disclosed in Patent Document 1 is known.

The antenna device of the related art is constructed by a plurality of loop antenna cells which are combined together under below-described conditions in order to satisfy the above-described requirements.

Formula 1

$$\sum_{i=0}^{i=n} NiIiSi = 0 \qquad (1*)$$

Here, Ni designates the number of windings of each loop antenna cell. Ii indicates an electric current supplied to each loop antenna cell and is designated by attaching plus and minus depending on its supplied direction. Si indicates an area of each loop antenna cell. "NiIiSi" indicates a magnetic moment generated by an i-th loop antenna cell.

The above-described loop antenna device of the related art has employed such a phenomenon that the alternating magnetic field reaching a part remote from the size of each loop antenna cell can be weakened. From a measurement test in which the intensity of the alternating magnetic field generated from such a loop antenna device is measured, it was confirmed that the intensity of the alternating magnetic field is drastically lowered as the alternating magnetic field is remote from the size of the loop.

Patent Document 1: JP-A-10-209737

However, the measurement test also showed that the above-noted advantage can be obtained stably only when the loop antenna device alone is disposed in a measurement environment. That is, even if the loop antenna device is designed in such a way that the intensity of the alternating magnetic field is abruptly lowered when the alternating field is remote from the loop size as described above, the influence of an environment around the loop antenna device causes an imbalance between the loop antenna cells, resulting in a strong magnetic field undesirably reaching a position remote from the loop size.

Specifically, when metal or the like is a symmetrically disposed in the vicinity of the loop antenna device, induced current may flow through the metal or the like to generate a magnetic field which deteriorates the intended balance between the loop antenna cells in the loop antenna device. Thus, when the loop antenna device is assembled into the reader/writer device, the intended balance between the loop antenna cells may be undesirably deteriorated.

Further, even if the loop antenna device is assembled into the reader/writer device with good balance, it would be practically impossible to maintain or obtain the balance, taking into account the environment around the loop antenna device, when the reader/writer device is installed.

Further, when a tag is placed on a specific one of the antenna cells, induced current flowing through a coil of the tag also causes a problem in which the balance between the loop antenna cells may be deteriorated similarly to the above-described case. In short, the solution in which the plurality of loop antenna cells are combined together to adjust the sum total of the magnetic moments to be "0" still suffers from a problem in which the intended balance between the loop antenna cells is readily deteriorated in practical use.

With the above-described problems taken into consideration, it is an object of the present invention to provide a loop antenna device having a plurality of small antenna cells combined together, which can compensate for imbalance caused between loop antenna cells by the change of an operating environment and which can constantly reduce the sum total of magnetic moments generated from the loop antenna cells to be a minimum, preferably "0".

SUMMARY OF THE INVENTION

A loop antenna device according to the present invention has a plurality of small loop antenna cells magnetically coupled to an antenna coil of a non-contact type data carrier to transmit signals to the non-contact type data carrier. The small loop antenna cells generate magnetic moments in directions opposite to one another to transmit the signals to the non-contact type data carrier. The sum of the magnetic moments generated from all the small loop antenna cells is zero. A conductor forming a short ring is provided collectively for all the small loop antenna cells.

The present invention is further characterized in that conductors forming the small loop antenna cells and the conductor forming the short ring are laminated on a base.

The present invention is further characterized in that the plurality of small loop antenna cells are respectively provided with electric field shielding conductors that reduce electric field components emitted from the small loop antenna cells. Each of the electric filed shielding conductors has a gap for preventing formation of a short ring.

The present disclosure relates to the subject matter contained in Japanese patent application No. 2003-209684 (filed on Aug. 29, 2003), which is expressly incorporated herein by reference in its entirety.

DESCRIPTION OF THE PREFERRED EMBODIMENT

Now, an embodiment of a loop antenna device according to the present invention will be described by referring to the accompanying drawings.

Figure 1:
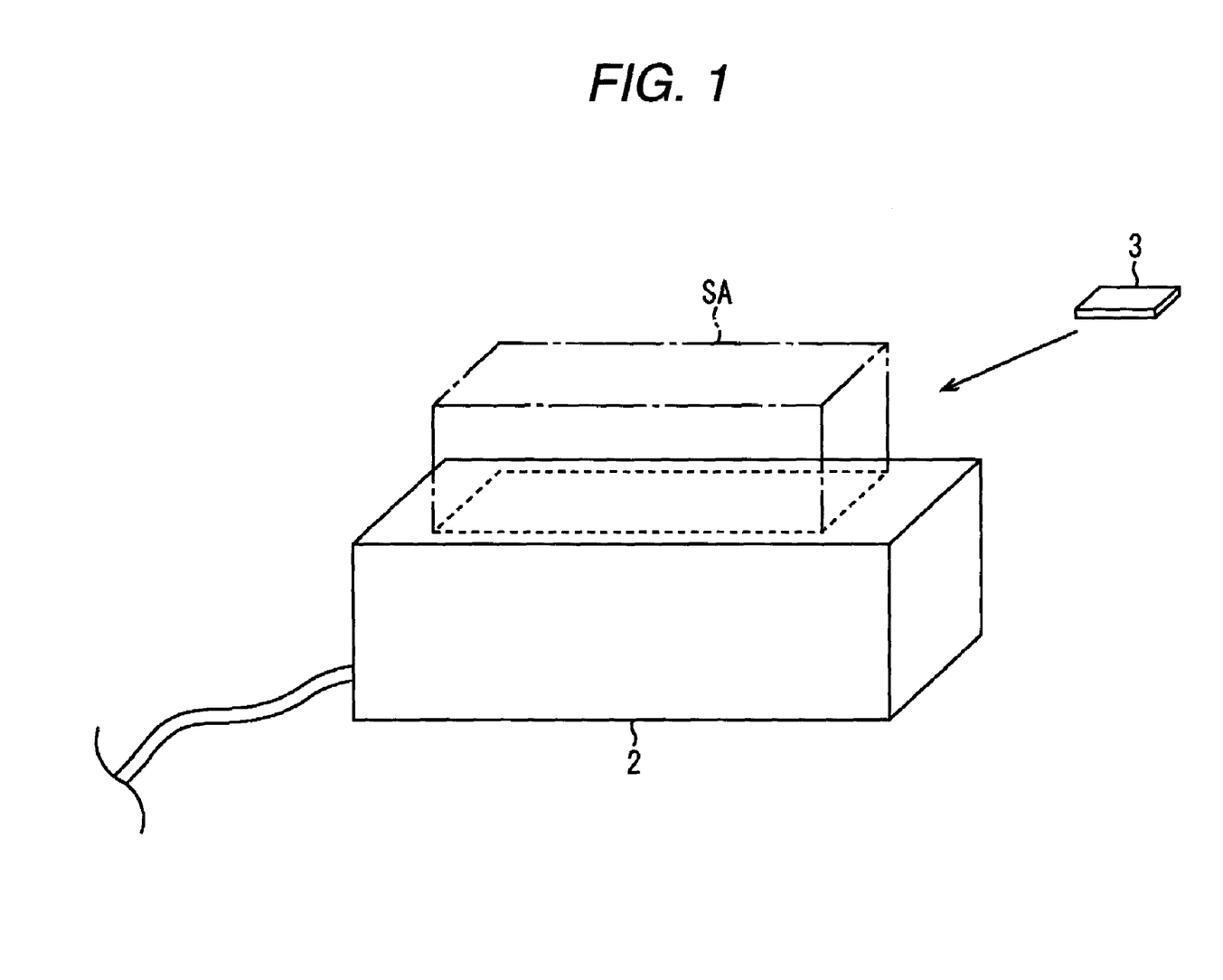
FIG. 1 shows an embodiment of the present invention depicting a state that a data carrier is allowed to come close to a service area of a loop antenna device.

FIG. 1 shows one example of a situation in which the loop antenna device of this embodiment is employed and a data carrier 3 is allowed to come near to a service area SA of a reader/writer device 2.

Figure 2:
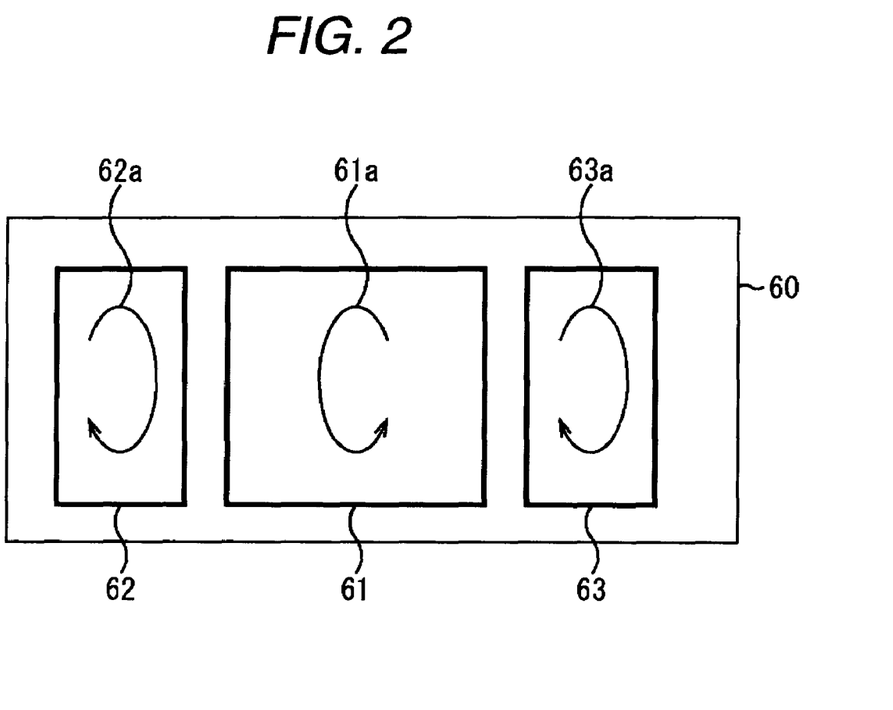
FIG. 2 shows the loop antenna device of this embodiment illustrating a state that three small loop coils are disposed on a base.

As shown in FIG. 2, a loop antenna device according to this embodiment has three small loop coils for data transmission, i.e. a first small loop coil 61, a second small loop coil 62 and a third small loop coil 63 that are formed on a base 60. The loop antenna device according to the present invention may have more number of small loop coils.

The first small loop coil 61 has an area two times as large as that of the second small loop coil 62 or the third small loop coil 63. Further, as shown in FIG. 2, the direction of an alternating magnetic field 61a generated in the first small loop coil 61 is opposite to those of alternating magnetic fields 62a and 63a generated in the second small loop coil 62 and the third small loop coil 63. This makes it easier to obtain balance of the first to third small loop coils (cells) 61, 62, and 63, i.e. to set the sum of magnetic moments generated from the small loop antenna coils (cells) 61, 62 and 63 to be zero. According to the present invention, the directions of small loop coils may be set in an arbitrary manner as long as the sum of magnetic moments generated from the small loop antenna coils is zero.

Figure 3:
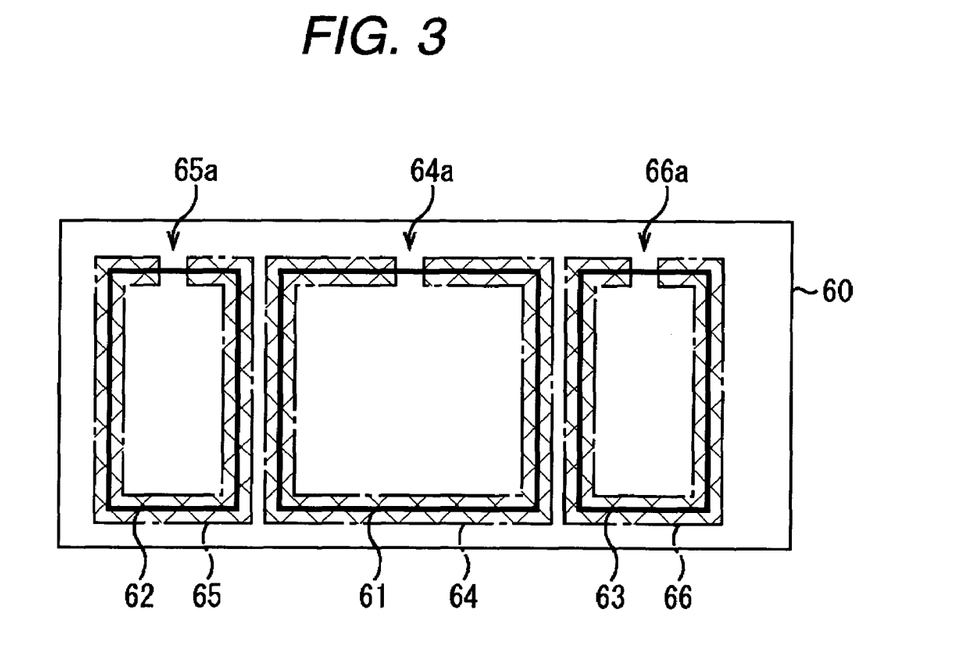
FIG. 3 shows a view depicting a state that electric field shielding conductors are provided on the three small loop coils.

Further, as shown in FIG. 3, electric field shields 64, 65 and 66 are disposed on the first, second and third small loop coils 61, 62 and 63, respectively. These electric field shields 64, 65 and 66 are provided to shield electric field components radiated from the first, second and third small loop coils 61, 62 and 63. The electric field shields 64, 65 and 66 are electrically insulated from the first, second and third small loop coils 61, 62 and 63. To this end, an electrically insulating layer is preferably interposed between the first, second and third small loop coils 61, 62 and 63 and the electric field shields 64, 65 and 66.

A high frequency electric power signal in the form of an electric field and a magnetic field is outputted from each of the small loop coils 61, 62 and 63. However, a data carrier system only requires a magnetic field component to execute its operation including communication. Since the electric field component interferes with a communication between other reader/writer and data carrier or a communication in other wireless devices, the generation of electric component is not preferable.

Thus, as shown in FIG. 3, in this embodiment, the first electric field shielding conductor 64 is provided for the first small loop coil 61, the second electric field shielding conductor 65 is provided for the second small loop coil 62 and the third electric field shielding conductor 66 is provided for the third small loop coil 63, respectively.

A gap 64a is provided in the first electric field shielding conductor 64. A gap 65a is provided in the second electric field shielding conductor 65. A gap 66a is provided in the third electric filed shielding conductor 66.

Of electromagnetic waves radiated from the first small loop coil 61, the second small loop coil 62 and the third small loop coil 63, the electric field components are shielded by the first electric field shielding conductor 64, the second electric field shielding conductors 65 and the third electric field shielding conductor 66, whereas the magnetic field components are not blocked and are generated by providing the above-described gaps 64a, 65a and 66a.

Figure 4:
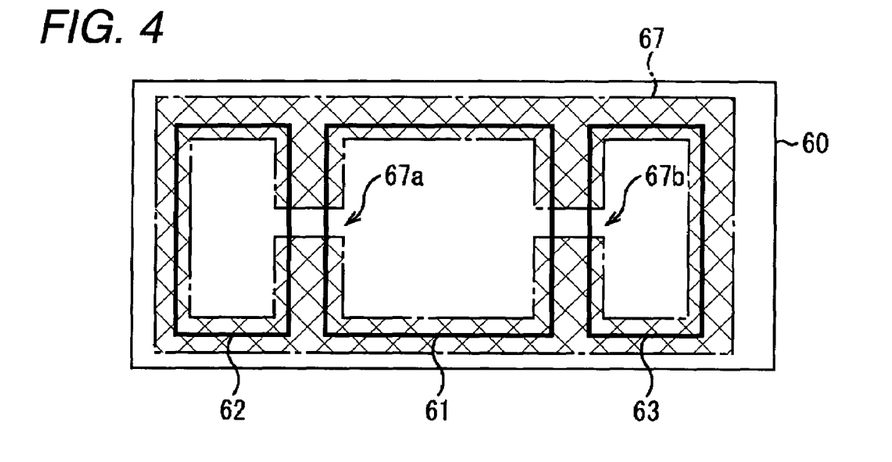
FIG. 4 is a view showing a state that a short ring pattern is provided on an antenna coil pattern.

Further, as shown in FIG. 4, a short ring pattern 67 is overlapped and disposed on the electric field shielding conductors 64, 65 and 66. The short ring pattern 67 serves as a pattern of a short ring collectively for the three small loop coils 61, 62 and 63. In addition, an electrically insulating layer may be interposed between the short ring pattern 67 and each of the electric field shielding conductors 64, 65 and 66.

Since the above-described short ring pattern 67 has gaps 67a and 67b, the short ring pattern 67 does not form a short ring for individual one of the three small loop coils 61, 62 and 63. Therefore, when imbalance between the three small loop coils 61, 62 and 63 is caused, current is induced on and flows through the short ring pattern 67 to generate a magnetic field, thereby making the magnetic moment of the entire loop antenna device zero.

Specifically, the loop antenna device of this embodiment is designed so that the radiation of the electric field components that interferes with the operation or communication of the data carrier system is made as small as possible to perform a good communication with the data carrier.

Further, the loop antenna device of this embodiment has the short ring pattern 67 which is overlapped with an outer peripheral portion of the loop antenna device having a plurality of loop antenna cells 61, 62 and 63 combined together to form a short ring for the loop antenna device having a plurality of loop antenna cells 61, 62 and 63 combined together and which also serves as the shield.

That is, in the case of the loop antenna device of this embodiment, since the sum total of the magnetic moments radiated from the plurality of the loop antenna cells 61, 62 and 63 is "0", the electric current does not originally flow through the outer short ring pattern 67 serving also as the shield.

However, when metal or the like comes close to or is disposed in the vicinity of the loop antenna device to cause imbalance between the small loop antenna cells 61, 62 and 63, the electric current is induced on the short ring pattern 67 to generate a magnetic field. The generated magnetic field functions to correct the imbalance. When the data carrier comes near to a specific one of the antenna cells to cause imbalance, the above-described operation is likewise carried out.

That is, in this embodiment, the plurality of loop antenna cells 61 to 63 are combined together so that the sum of the magnetic moments generated from all the loop antenna cells is zero. Further, the short ring pattern 67 serving also as the shield is provided in the outer peripheral portion of the combined loop antenna cells 61 to 63. Thus, the characteristics of the loop antenna that supplies a strong magnetic field to a near place and only a weak magnetic field to a remote place can be effectively maintained even when metal or the data carrier comes near to the loop antenna device at an installation site to cause imbalance. Further, when many data carriers concentrically come near to a specific antenna cell, a change width in which the magnetic field intensity of an antenna cell area changes can be effectively suppressed.

Figure 5:
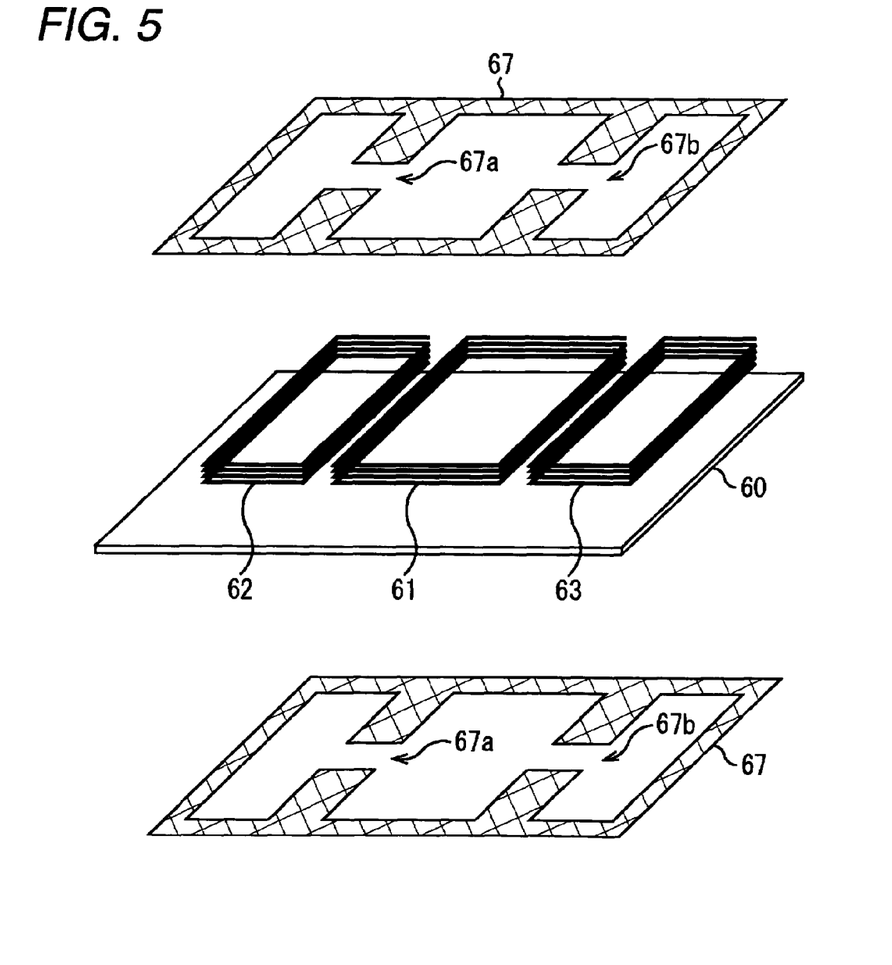
FIG. 5 shows a modified example of the embodiment and illustrates an exploded perspective view of a main structure of a loop antenna device.

FIG. 5 shows an exploded perspective view of a loop antenna device according to a modified example of the above-mentioned embodiment. As shown in FIG. 5, the loop antenna device of the modified example includes the first small loop coil 61, the second small loop coil 62 and the third small loop coil 63 that are formed on the base 60 to form a plurality of loop antenna cells.

Further, short ring patterns 67 serving also as electric field shield are provided in the upper side and the lower side of the plurality of the loop antenna cells 61, 62 and 63, respectively. Since the short ring pattern 67 has an effect of an electric field shield, the electric field shields 64, 65 and 66 are omitted in the loop antenna device of the modified example shown in FIG. 5. Each of the short ring patterns 67 is electrically insulated from the plurality of the loop antenna cells 61, 62 and 63. The modified example is designed so that one of the short ring patterns 67 (i.e. the upper short ring pattern 67 in FIG. 5) is provided to a surface of the base 60 where the loop antenna cells 61, 62 and 63 are disposed, whereas the other of the short ring pattern 67 (i.e. the lower short ring pattern 67) is disposed on an opposite surface of the base 69 to correspond in position to the loop antenna cells 61, 62 and 63. The other short ring pattern 67 (i.e. the lower short ring pattern) may be disposed between the base 60 and the loop antenna cells 61, 62 and 63 so that both of the short ring patterns 67 are provided to the same surface of the base 60 where the loop antenna cells 61, 62 and 63 are disposed.

Figure 9:
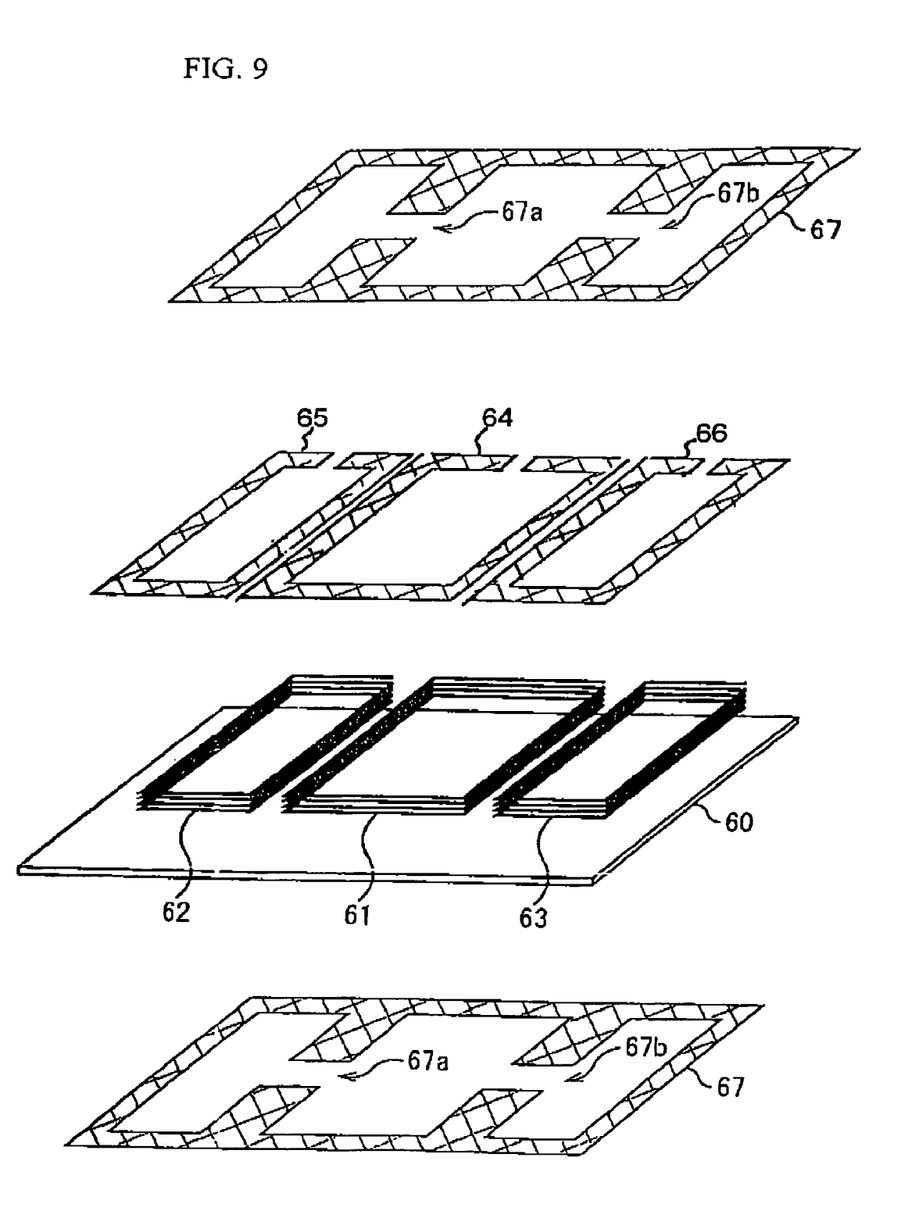
FIG. 9 shows a modified example of the embodiment and illustrates an exploded perspective of a loop antenna device in which electric field shields are interposed between a short ring pattern and loop antenna cells.

With reference to FIG. 9, an example of a loop antenna device is shown in which electric field shields 64, 65, and 66 are disposed between an upper short ring pattern 67 and the plurality of loop antenna cells 61, 62, and 63, which are provided on the surface of the base 60. Further, a lower short ring pattern 67 is disposed on an opposite surface of the base 60.

Figure 6:
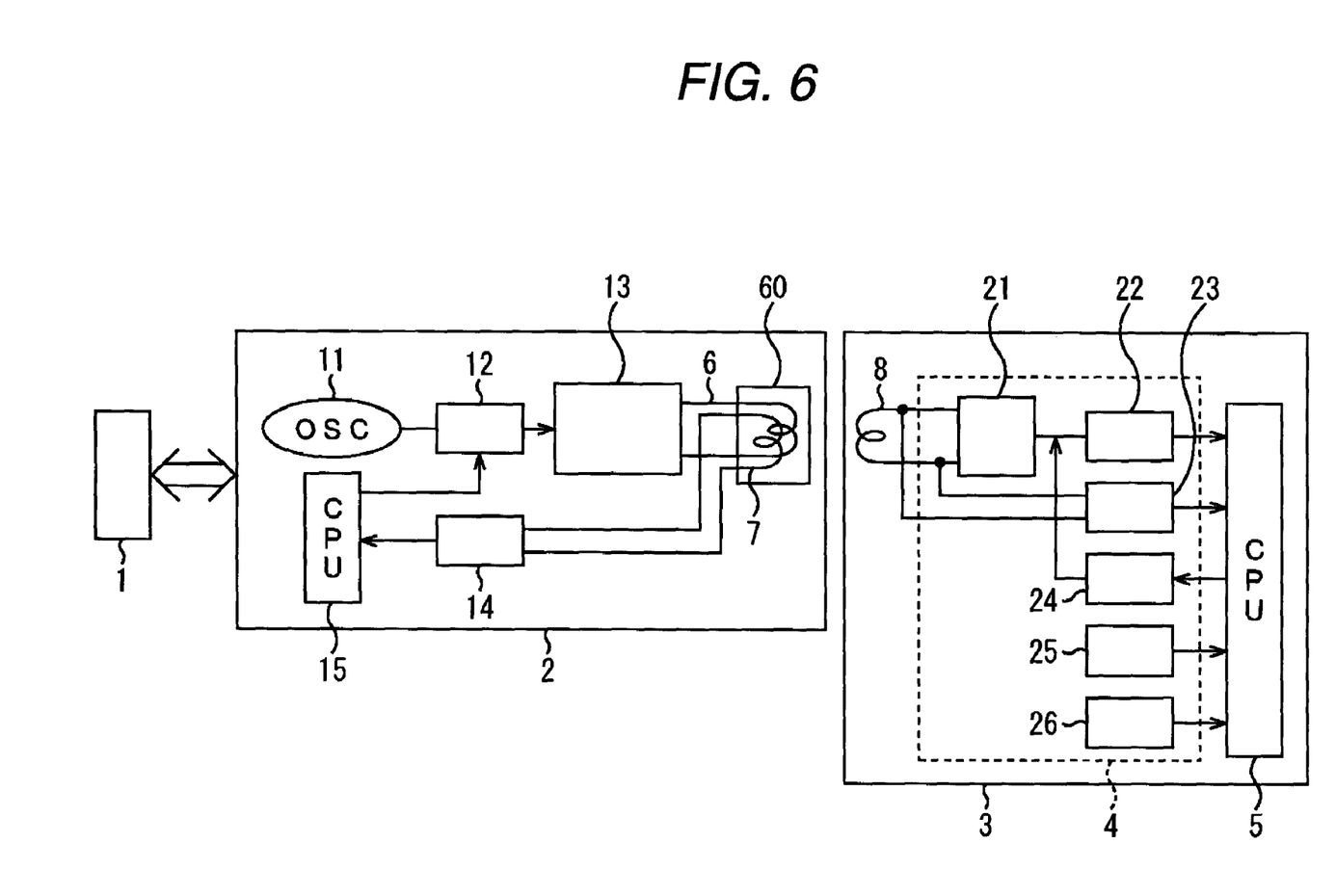
FIG. 6 is a block diagram showing a schematic structure of a data carrier system.

Now, referring to FIG. 6, one example of a data carrier system using the loop antenna device according to this embodiment will be described below.

In a reader/writer 2, data from a host 1 is processed in a CPU 15 and transmitted to a transmitting circuit 12. A high frequency signal having a prescribed amplitude is supplied from an oscillation circuit 11 to the transmitting circuit 12 and the high frequency signal is modulated by the transmitted data to output a modulated high frequency signal.

The modulated high frequency signal is sent to a transmitting coil 6 formed on the base 60 through a driver 13. In this embodiment, the transmitting coil 6 is constructed by the first small loop coil 61, the second small loop coil 62 and the third small loop coil 63.

A data carrier 3 comes close to the reader/writer 2 and the transmitting coil 6 of the reader/writer 2 is electro-magnetically coupled to an antenna coil 8 of the data carrier 3. Accordingly, the modulated high frequency signal is supplied from the transmitting coil 6 of the reader/writer 2 to a transmitting/receiving circuit 4 of the data carrier 3 through the antenna coil 8 of the data carrier 3.

The modulated high frequency signal is rectified in a rectifying circuit 21 and supplied to a power circuit 22 to generate prescribed source voltage necessary for respective parts of the data carrier 3. Further, an output signal of the antenna coil 8 is also supplied to a receiving circuit 23 in which the data is demodulated and the demodulated data is supplied to a CPU 5. The CPU 25 operates on the basis of the outputs of a timing circuit 25 and a reset circuit 26, processes the supplied data and writes prescribed data in a memory that is not shown in the drawing.

Finally, a case that the data is transmitted from the data carrier 3 to the reader/writer 2, that is, a receiving mode, will be described.

From the transmitting circuit 12 of the reader/writer 2, the non-modulated high frequency signal having the prescribed amplitude is outputted and transmitted to the data carrier 3 through the driver 13, the transmitting coil 6 and the antenna coil 8.

At this time, the data carrier 3 comes close to the reader/writer 2 so that the transmitting coil 6 of the reader/writer 2 is magnetically coupled to the antenna coil 8 of the data carrier 3. Accordingly, the high frequency signal is supplied from the transmitting coil 6 of the reader/writer 2 to the transmitting/receiving circuit 4 of the data carrier 3 through the antenna coil 8 of the data carrier 3. This high frequency signal is rectified in the rectifying circuit 21 and the rectified signal is supplied to the power circuit 22 to generate the prescribed source voltage necessary for the respective parts of the data carrier 3.

On the other hand, in the data carrier 3, data read from the memory that is not illustrated in the drawing is processed in the CPU 5 and supplied to a transmitting circuit 24. The transmitting circuit 24 includes, for instance, a load resister and a switch, and the switch is turned on and off in accordance with "1" and "0" bits of the data. As described above, when the switch of the transmitting circuit 24 is turned on and off, a load to the antenna coil 8 is varied.

Accordingly, in the reader/writer 2, the amplitude of high frequency current flowing through a receiving coil 7 is varied. That is, the amplitude of high frequency current is modulated by the data supplied to the transmitting circuit 24 from the CPU 5 of the data carrier 3. This modulated high frequency signal is demodulated in a receiving circuit 14 to obtain the data. This data is processed in the CPU 15 and transmitted to the host 1.

As a use of the data carrier 3, not only one card may be treated at a time like a credit card or electronic money, but also a plurality of cards may be treated at a time, for instance, the management of books or the inventory management of goods. In this case, the data carriers 3 are attached to a plurality of books or goods one by one and the information of the books or goods is read by the reader/writer 2, or a specific book or goods is searched among these books or goods.

In such a case, the data carrier 3 needs to be compact and the transmitting and receiving coils 6 and 7 of the reader/writer 2 need to be enlarged. When the data carrier 3 is made compact, the antenna coil 8 contained therein is necessarily compact. Consequently, to supply electric power necessary for operating the data carrier 3, a magnetic field intensity generated in the transmitting coil 6 of the reader/writer 2 needs to be strengthened.

On the other hand, unnecessary electromagnetic waves need not to be radiated outside a service area SA as described above. As described above, the transmitting coil 6 of this embodiment is designed so that the plurality of loop antenna cells 61 to 63 are combined together to make the sum of magnetic moments generated from all the loop antenna cells zero, and that the short ring pattern 67 serving also as the shield is provided in the outer peripheral portion of the combined loop antenna cells 61 to 63.

Accordingly, since the characteristics of the loop antenna that supplies a strong magnetic field to a near place and only a weak magnetic filed to a remote place can be maintained even when metal or the data carrier comes close to the loop antenna at an installation site to cause imbalance, the above-described requirements can be sufficiently satisfied.

Now, the measurement examples of specific effects are shown below.

Figure 7:
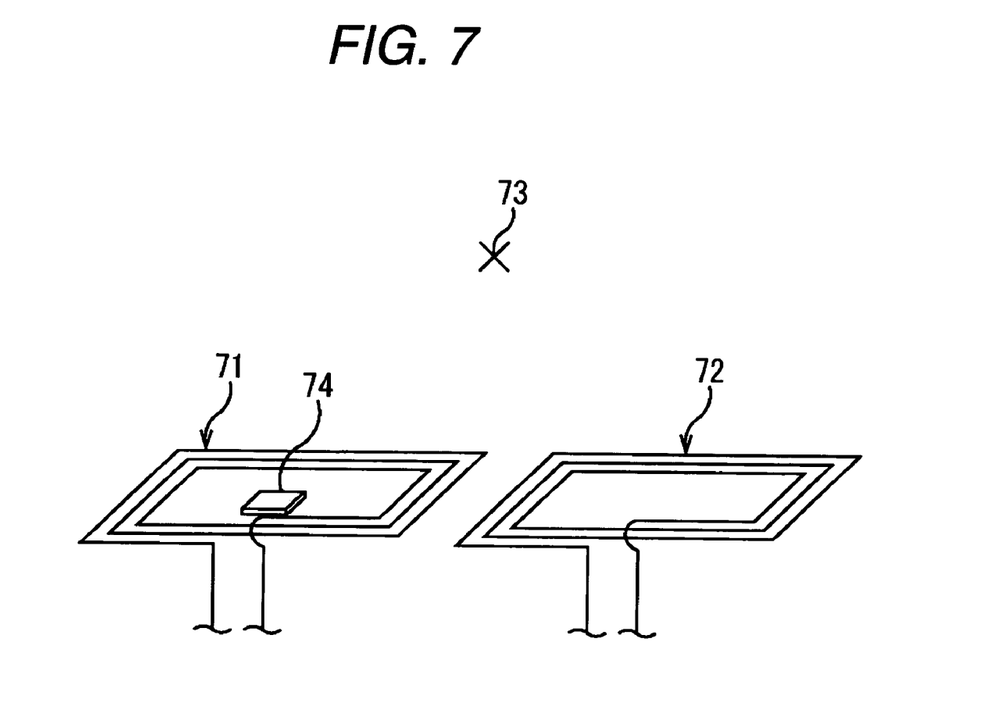
FIG. 7 is a view showing an experimental example for detecting the intensity of a magnetic field generated due to imbalance between loop antennas when no short ring pattern is disposed.

As shown in FIG. 7, loop coils 71 and 72 of 60 mm×120 mm are arranged in parallel. Here, the "number of windings" of the first loop coil 71 and the second loop coil 72 is "15T", an "inductance L value is 130 µH" and a "Q value is 33". These values are constant irrespective of the presence or absence of the short ring. Further, a "measurement frequency is 125 KHz". A magnetic field is detected at a detecting point 73, which is a central point where a balance is maintained, i.e. the magnetic field is zero.

In a case in which no short ring pattern, when an aluminum plate 74 of 40 mm square having the thickness of 1 mm is placed at a position of 20 mm in the lower part of the first loop coil 71 side, imbalance is caused between the first loop coil 71 and the second loop coil 72, and thus the magnetic field is detected.

Figure 8:
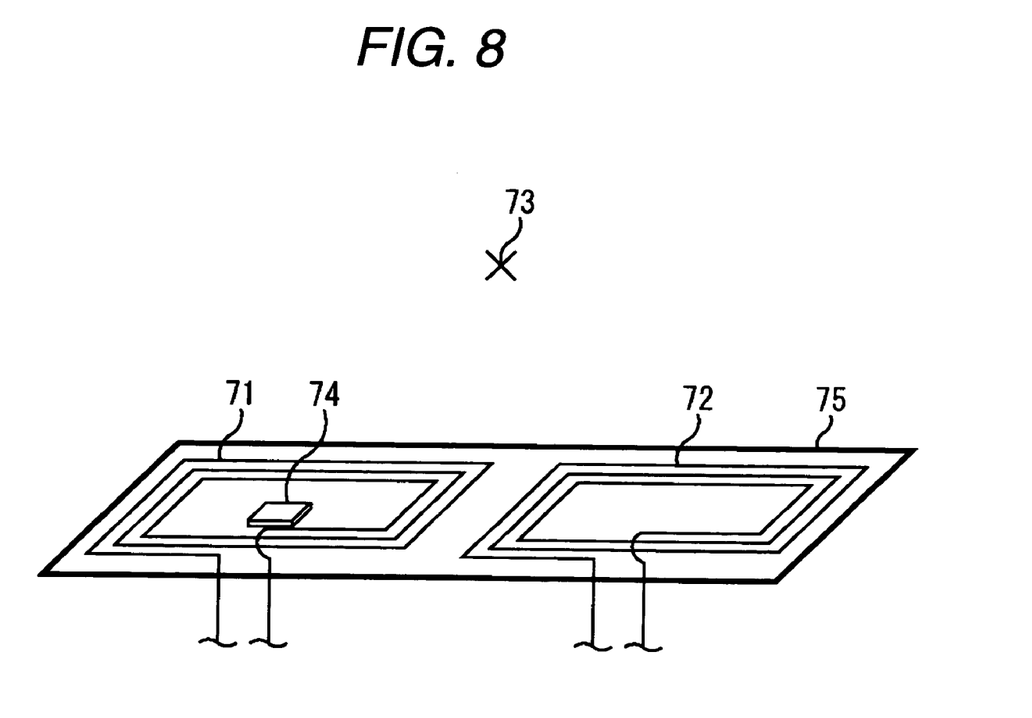
FIG. 8 is a view showing an experimental example for detecting the intensity of a magnetic field generated due to imbalance between loop antennas when a short ring pattern is disposed.

FIG. 8 depicts an experimental example for detecting the intensity of a magnetic field generated due to imbalance between the loop antennas when there is a short ring pattern. As shown in FIG. 8, even when the short ring patter 75 is provided, if an aluminum plate 74 of 40 mm square having the thickness of 1 mm is placed at a position 20 mm in the lower part of the first loop coil 71 side, imbalance is caused between the first loop coil 71 and the second loop coil 72, and thus the magnetic field is detected. It was, however, confirmed that the intensity of the magnetic field at the detecting point is suppressed to a half as high as the intensity of the magnetic field detected when the short ring pattern is not provided and the amount of imbalance is reduced.

According to results of further experiment using the same coils, when 10 pieces of data carriers are placed only in one of the antenna cells, a field intensity ratio from left to right is changed from "100: 100 to 92:100" in the case in which no short ring pattern is used.

On the other hand, in the case of having the short ring pattern, the field intensity ratio is changed from "100:100 to 96:100". As apparent from these results, when the short ring pattern is provided, the amount of imbalance is reduced.

As described above, according to the present invention, a loop antenna device has a plurality of small loop antenna cells magnetically coupled to an antenna coil of a non-contact type data carrier to transmit signals to the non-contact type data carrier, and further has a conductor forming a short ring collectively for all the plurality of small loop antenna cells. The plurality of small loop antenna cells are designed so that the directions of the magnetic moments of the signals transmitted to the non-contact type data carrier are opposite to one another, and that the sum of the magnetic moments generated from all the small loop antenna cells is zero. When imbalance is caused between the loop antenna cells due to the influence of an environment around the loop antenna device, the induced current flows through the conductor forming the short ring to generate a magnetic field for compensating the imbalance between the loop antenna cells. Thus, even when metal or the like is asymmetrically disposed in the vicinity of the antenna, or the data carrier is placed on a specific antenna cell to cause imbalance between the loop antenna cells during the operation, the loop antenna device can effectively compensate the imbalance between the loop antenna cells and prevent unnecessary electromagnetic waves from being radiated to remote places.

What is claimed is:

1. A loop antenna device comprising a plurality of small loop antenna cells magnetically coupled to an antenna coil of a non-contact type data carrier to transmit signals to a non-contact type data carrier, wherein:
   the small loop antenna cells generate magnetic moments in directions opposite to one another to transmit the signals to the non-contact type data carrier;
   the sum of the magnetic moments generated from all the small loop antenna cells is zero; and
   the loop antenna device further comprising conductor that forms a short ring collectively for all the small loop antenna cells, and
   electric field shielding conductors that are respectively provided on the small loop antenna cells to reduce electric field components emitted from the small loop antenna cells, wherein each of the electric field shielding conductors includes a gap for preventing formation of a short ring such that a portion of each of the small loop antenna cells is exposed.

2. A loop antenna device according to claim 1, wherein conductors forming the small loop antenna cells and the conductor forming the short ring are laminated on a base.

3. A loop antenna device according to claim 1, wherein the conductor that forms the short ring collectively for all the small loop antenna cells is adapted to compensate an imbalance between the small loop antenna cells caused due to influence of an environment around the loop antenna device.

4. A loop antenna device comprising:
   a base;
   a first conductor forming a plurality of loop antenna cells, the first conductor being provided to a first surface of the base; and
   a second conductor being provided to the first surface of the base, the second conductor including:
      an outer continuous ring portion overlaid above an outer peripheral portion of the first conductor; and
      an inner discontinuous portion defining a gap or gaps by which the second conductor is discontinuous above each of the loop antenna cells, wherein the first conductor forms at least three loop antenna cells that are provided to the first surface of the base.

5. A loop antenna device according to claim 4, further comprising:
a third conductor forming electric shields and being disposed between the first and second conductors, each of the electric shields being substantially overlaid above but discontinuous above a corresponding one of the plurality of loop antenna cells.

6. A loop antenna device according to claim 4 or 5, further comprising:
a fourth conductor including:
an outer continuous ring portion overlaid above an outer peripheral portion of the first conductor; and
an inner discontinuous portion defining a gap or gaps by which the fourth conductor is discontinuous above each of the plurality of loop antenna cells,
the first conductor being interposed between the second conductor and the fourth conductor.

7. A loop antenna device according to claim 6, wherein the fourth conductor is provided to a second surface of the base opposite from the first surface of the base.

8. A loop antenna device according to claim 4, wherein the at least three loop antenna cells generate magnetic moments in directions opposite to one another to transmit signals to a non-contact type data carrier; and
the sum of the magnetic moments generated from all of the at least three loop antenna cells that are provided to the first surface of the base is zero.

9. A loop antenna device comprising:
a base;
a first conductor forming a plurality of loop antenna cells, the first conductor being provided to a first surface of the base; and
a second conductor being provided to the first surface of the base, and having:
an outer continuous ring portion overlaid above an outer peripheral portion of the first conductor;
an inner discontinuous portion defining a gap or gaps by which the second conductor is discontinuous above each of the loop antenna cells; and
a third conductor forming electric shields and being disposed between the first and second conductors, each of the electric shield being substantially overlaid above but discontinuous above a corresponding one of the loop antenna cells.

* * * * *